United States Patent
Metzler et al.

(10) Patent No.: US 9,940,240 B2
(45) Date of Patent: Apr. 10, 2018

(54) PERSISTENT CACHING FOR OPERATING A PERSISTENT CACHING SYSTEM

(71) Applicant: International Business Machines Corporation, Armonk, NY (US)

(72) Inventors: Bernard Metzler, Zurich (CH); Martin L. Schmatz, Rueschilikon (CH); Patrick Stuedi, Zurich (CH); Animesh K. Trivedi, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 445 days.

(21) Appl. No.: 14/514,412

(22) Filed: Oct. 15, 2014

(65) Prior Publication Data
US 2015/0113088 A1    Apr. 23, 2015

(30) Foreign Application Priority Data
Oct. 23, 2013  (CH) ..................................... 1318712

(51) Int. Cl.
*G06F 15/167*    (2006.01)
*G06F 12/0866*   (2016.01)

(52) U.S. Cl.
CPC .... *G06F 12/0866* (2013.01); *G06F 2212/224* (2013.01); *G06F 2212/461* (2013.01); *G06F 2212/463* (2013.01); *Y02B 60/1225* (2013.01)

(58) Field of Classification Search
USPC ......................... 709/212, 213, 214, 215, 216
See application file for complete search history.

(56) References Cited

U.S. PATENT DOCUMENTS

| | | |
|---|---|---|
| 6,598,143 B1 | 7/2003 | Baker et al. |
| 7,325,099 B2 | 1/2008 | Jain et al. |
| 7,509,460 B2 | 3/2009 | Zeffer et al. |
| 8,255,922 B1 | 8/2012 | Fresko et al. |
| 2005/0097183 A1 | 5/2005 | Westrelin |

(Continued)

FOREIGN PATENT DOCUMENTS

| | | |
|---|---|---|
| EP | 2150019 A1 | 2/2010 |
| GB | 2519534 A | 4/2015 |
| WO | 2009062063 A1 | 5/2009 |

OTHER PUBLICATIONS

Chu, et al., "A Distributed Paging RAM Grid System for Wide-Area Memory Sharing", 1-4244-0054-6/06, ©2006, IEEE.

(Continued)

*Primary Examiner* — Liangche A Wang
(74) *Attorney, Agent, or Firm* — Isaac J. Gooshaw

(57) ABSTRACT

A persistent caching system is provided. The persistent caching system includes a storage system having a caching server for storing data, and a client for accessing the data through a network. The caching server is configured to store the data in a number of virtual memory blocks. The virtual memory blocks refer to an associated memory-mapped file in a file system of the caching server. The caching server is configured to export addresses of the virtual memory blocks to the client. The client is configured to access at least some of the virtual memory blocks through RDMA using the exported addresses. The caching server is configured to page virtual memory blocks being accessed by one or more clients through RDMA to and/or from the memory-mapped files associated with the accessed virtual memory blocks.

16 Claims, 4 Drawing Sheets

(56) References Cited

U.S. PATENT DOCUMENTS

| | | |
|---|---|---|
| 2007/0124407 A1 | 5/2007 | Weber et al. |
| 2009/0287902 A1 | 11/2009 | Fullerton et al. |
| 2011/0066824 A1 | 3/2011 | Bestler |
| 2011/0161557 A1 | 6/2011 | Haines et al. |
| 2012/0011500 A1* | 1/2012 | Faraboschi ......... G06F 12/1491 718/1 |
| 2013/0110961 A1 | 5/2013 | Jadhav |
| 2013/0227201 A1 | 8/2013 | Talagala et al. |
| 2014/0143365 A1* | 5/2014 | Guerin ............. G06F 15/17331 709/212 |
| 2014/0164545 A1* | 6/2014 | Davis ..................... G06F 13/28 709/212 |
| 2014/0181181 A1* | 6/2014 | Greenfield ............. H04L 69/22 709/203 |
| 2014/0201451 A1* | 7/2014 | Dube .................... G06F 12/084 711/130 |
| 2017/0010825 A1 | 1/2017 | Kisley et al. |

OTHER PUBLICATIONS

Gu, et al., "RAMS: A RDMA-Enabled I/O Cache Architecture for Clustered Network Servers", Published in: Proceeding SNAPI '04 Proceedings of the international workshop on Storage network architecture and parallel I/Os, pp. 66-72, ACM New York, NY, USA, ©2004, doi>10.1145/1162628.1162637, pp. 1-3.

Karampogias, "An In-Memory RDMA-Based Architecture for the Hadoop Distributed Filesystem", Aug. 21, 2012, pp. 1-48.

Kim et al., "CloudRAMSort: Fast and Efficient Large-Scale Distributed RAM Sort on Shared-Nothing Cluster", pp. 841-850, SIGMOD '12, May 20-24, 2012, Scottsdale, Arizona, USA, Copyright 2012, ACM 978-1-4503-1247-Sep. 12, 2005.

Intellectual Property Office, Application No. 1318712.5, Search Report, Mar. 31, 2014.

* cited by examiner

PERSISTENT CACHING FOR OPERATING A PERSISTENT CACHING SYSTEM

CROSS REFERENCE TO RELATED APPLICATION

Pursuant to 35 U.S.C. § 119, the present application claims priority to United Kingdom Application No. 1318712.5, filed Oct. 23, 2013, the entire contents of which are incorporated herein by reference.

FIELD OF THE INVENTION

The invention relates to a persistent caching system and to a method for operating a persistent caching system using RDMA (Remote Direct Memory Access).

BACKGROUND

Remote Direct Memory Access (RDMA) is a communication paradigm whereby application data is fetched directly out of a computer's local application memory and directly placed into the application memory of a remote computer. In bypassing the operating system and avoiding intermediate data copies in host memory, RDMA significantly reduces the central processing unit (CPU) cost of large data transfers. Complete data copy avoidance (zero-copy) is achieved if the network interface controller (NIC) is able to move networked data directly between the application (buffer) memory and NIC buffer using a Direct Memory Access (DMA) engine.

BRIEF SUMMARY OF THE INVENTION

According to a first embodiment, a persistent caching system is provided. The persistent caching system includes a storage system having at least one caching server for storing data, and clients configured for accessing the data through a network. The caching server is configured to store the data in a number of virtual memory blocks, wherein each of the virtual memory blocks refers to an associated memory-mapped file in a file system of the caching server. Further, the caching server is configured to export addresses (virtual addresses) of the virtual memory blocks to each of the clients. Each of the clients is configured to access at least some of the virtual memory blocks through RDMA using at least some of the exported addresses. The caching server is further configured to page one or more virtual memory blocks being accessed by one or more clients through RDMA to and/or from the memory-mapped files associated with the accessed virtual memory blocks.

In one embodiment, the present persistent caching system is identified by the clients as a storage system. In one embodiment, there a reduced need to maintain consistency between physical memory (cache) and persistence storage (disk). One embodiment of the present persistent caching system provides access to hot data with ultra-low latencies due to RDMA read operations from physical memory.

In one embodiment, the persistent caching system holds data bigger than cluster DRAM size. In one embodiment, recovery of data from the mapped files is available. In one embodiment, each of the caching servers can be shut down and re-started with reduced data loss. In one embodiment, a caching server, when started, creates the virtual memory block from the memory-mapped files on a disk containing the persistent data.

According to some implementations, the present persistent caching system may use RDMA lazy memory pinning and memory mapped files to build distributed in-memory storage directly from physical memory, e.g. operating system page caches of cluster nodes. By means of the memory-mapped files, it is possible to access files through memory. On memory access, the operating system may bring disk blocks into page cache on-demand. Further, the operating system may swap pages of the page cache into reference-mapped files. Thus, the memory may be recovered easily from files. A memory-mapped file is a segment of virtual memory which is assigned a direct byte-for-byte correlation with some portion of a file or file-like resource.

According to some implementations, the present persistent caching system provides paging in network-based shared nothing memory architecture.

In an embodiment, the storage system includes a plurality of caching servers configured to store the data. Each of the caching servers is configured to store at least a part of the data in a number of virtual memory blocks, wherein each of the virtual memory blocks refers to an associated memory-mapped file in a file system of the caching server. Each of the caching servers is further configured to export addresses of the virtual memory blocks to each of the clients. Each of the caching servers is further configured to page one or more virtual memory blocks being accessed by one or more clients through RDMA to and/or from the memory-mapped files associated with the accessed virtual memory blocks.

In one embodiment, the storage system includes a number of different caching servers, which may be interconnected by a certain interconnect.

As a result of the inclusion of a plurality of caching servers, some embodiments of the persistent caching system are embodied as persistent distributed caching systems.

In a another embodiment, the caching server is configured to serve RDMA read operations from the clients directly from its operating system page cache.

In one embodiment, a direct service for RDMA read operations is provided at the level of the operating system of the caching server. In another embodiment, the caching server is configured to serve RDMA read operations from the clients directly from its operating system page cache using an in-kernel soft-RDMA stack or using hardware supported RDMA.

For example, a client is configured to access the virtual memory blocks through soft-RDMA using the exported addresses.

In one embodiment, a client includes a client application and a storage library. The client application is linked to the storage library for accessing the storage system. In an embodiment, the client application uses the storage library to write data to and to read data from the plurality of caching servers, which may be called caching service.

In one embodiment, the storage library provides two operations: write and read. The write operation sends data to a caching server. The caching server then takes two actions: i) it stores (or copies) the data inside the virtual memory block, ii) it asks the kernel to page the virtual memory block out to the memory-mapped file. After the second step, the virtual memory block is persistently stored on disk. The read operation may use RDMA to access the virtual address of the memory block. In other words, it uses an RDMA read to read parts of the virtual memory block. In one embodiment, the RDMA read request is received by a network card at the caching server. The network card issues a DMA operation to copy the requested virtual memory block to the network card. From there, the virtual memory block is transmitted back to the client.

In some embodiments, during the processing of write requests at the caching server, the kernel (in particular the paging subsystem of the caching server) is involved. Specifically, pages of the virtual memory block that is being accessed are paged in from disk, or paged out to disk.

In some embodiments, during the processing of read requests at the caching server, the paging subsystem of the kernel of the caching server is involved, namely pages of the virtual memory block are paged in from disk.

In one embodiment, the storage library is adapted to communicate with the at least one caching server of the storage system when writing data to or reading data from the storage system.

In one embodiment, the client applications and the caching servers are adapted to run on a disjoint set of compute nodes in the network or on a common set of compute nodes in the network.

In one embodiment, the client applications and the caching servers run on an overlapping set of compute nodes.

In one embodiment, the caching server is configured to create the virtual memory blocks using the memory-mapped files.

In one embodiment, the caching server is configured to store the data of one of the virtual memory blocks in a physical memory or on a disk in the associated memory-mapped file at any given time. Thus, the caching server is adapted to page or swap the data of one of the virtual memory blocks at its own decision at any given time.

In one embodiment, a kernel of the caching server includes a paging subsystem which is configured to decide, at any given time, on storing the data of one of the virtual memory blocks in the physical memory or on the disk in the memory-mapped file. Thus, for each virtual memory block, the decision about when the memory block should be present in physical memory, and when the memory block should be held on disk in the file, is made by the kernel of the caching server, namely by the paging subsystem of the kernel.

In one embodiment, the paging subsystem is configured to keep more frequently accessed virtual memory blocks present in the physical memory and less frequently accessed virtual memory blocks on the disk in the memory-mapped file. Thus, the more frequently accessed virtual memory blocks are provided faster than less frequently accessed memory blocks. Thus, the overall latency is decreased.

In one embodiment, the paging subsystem includes a dividing entity and a deciding entity, wherein the dividing entity is configured to subdivide a virtual memory block into a plurality of pages, wherein the deciding entity is configured to decide on keeping a first part of the pages in the physical memory and a second part of the pages on the disk. The deciding entity may decide to keep parts of the virtual memory block, e.g. some pages, in physical memory and some other pages on disk.

In one embodiment, the storage library is configured to provide a write operation through RDMA for writing data into the storage subsystem and a read operation through RDMA for reading data from the storage system.

In one embodiment, after receiving data from the storage library of one of the clients, the caching server is configured to store the received data in the number of virtual memory blocks and to ask the kernel to page the number of virtual memory blocks out to the associated memory-mapped file.

In one embodiment, the paging subsystem is configured to page at least one page of the virtual memory block being accessed by the write operation in from the disk and to page it later out to the disk.

In one embodiment, after receiving an RDMA read request from a requesting client at a network card of the caching server, the network card is configured to issue a DMA operation to copy the virtual memory block requested by the RDMA read request to the network card and to transmit the copied virtual memory block to the requesting client.

In one embodiment, the paging subsystem is configured to page at least one page of the virtual memory block being accessed by the read operation in from the disk.

In one embodiment, access rights are allocated to at least one of the memory-mapped files. The allocated access rights determine which clients are allowed to access the at least one of the memory-mapped file.

According to a second embodiment, the invention is embodied as a method for operating a persistent caching system including a storage system having at least one caching server for storing data, and clients configured for accessing the data through a network. In a first step, the data is stored in a number of virtual memory blocks by the caching server, wherein each of the virtual memory blocks refers to an associated memory-mapped file in a file system of the caching server. In a second step, addresses of the virtual memory blocks are exported from the caching server to each of the clients. In a third step, at least some of the virtual memory blocks are accessed by at least one of the clients through RDMA using at least some of the exported addresses. In a fourth step, one or more virtual memory blocks being accessed by one or more clients through RDMA are paged to and/or from the memory-mapped files associated with the accessed virtual memory blocks.

According to a third embodiment, a non-transitory computer program product is provided which comprises a program code for executing the method of the above second embodiment, and for configuration, at least in part, of the first embodiment for operating a persistent caching system when run on at least one computer.

BRIEF DESCRIPTION OF THE DRAWINGS

Similar or functionally similar elements in the figures have been allocated the same reference signs if not otherwise indicated.

DETAILED DESCRIPTION OF THE EMBODIMENTS

The ever increasing amount of data stored and processed in data centers often poses challenges not only to the data processing itself, but also in terms of power consumption and latency requirements. In particular, analytics and large-scale web applications running in data centers have stringent latency requirements.

To accommodate the latency requirements, applications may try to reduce data access latencies by storing much of the data in dynamic random-access memory (DRAM)-based storage systems. However, in some scenarios, there is not enough DRAM to keep all the data in memory all the time. Further, availability is not guaranteed. Moreover, in-memory storages are known. In an in-memory storage, all the data is included inside a large distributed DRAM-based storage system with guaranteed availability. However, such storage systems require a large amount of dynamic random-access memory and special battery-backed buffers.

The present invention will now be described in detail with reference to the Figures.

As used in the following description, paging may be understood as swapping. Swapping virtual memory blocks to and/or from persistent files means either writing data from physical memory to persistent files, or reading data from persistent files into physical memory. Further, the terms virtual memory blocks and memory-mapped files may be used interchangeably, e.g. each virtual memory block is referring to a memory-mapped file.

Figure 1:
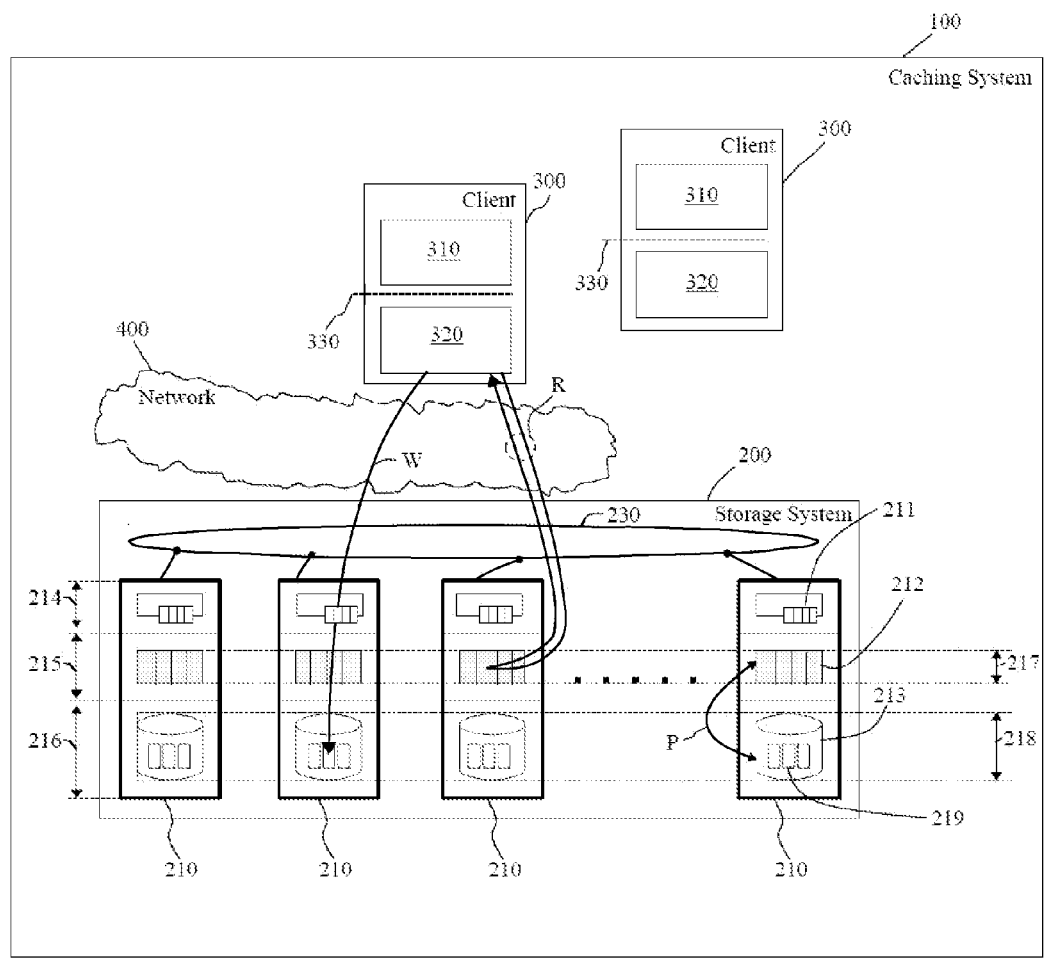
FIG. 1 shows a schematic block diagram of an embodiment of a persistent caching system.

One embodiment of the present invention to provides an improved system for caching data. In FIG. 1, a schematic block diagram of an embodiment of a persistent caching system, 100, is depicted. Persistent caching system 100 of FIG. 1 includes a number of clients 300 and storage system 200. Without loss of generality, FIG. 1 shows two clients 300. As such, in other embodiments, the number of clients 300 may be different.

Storage system 200 comprises a plurality of caching servers 210 which may be coupled by interconnect 230. Clients 300 and storage system 200 may be connected by or may be part of network 400, e.g. the internet or a local area network (LAN). Each of caching servers 210 includes user space 214, kernel 215 and I/O space 216. Because caching servers 210 are interconnected to one storage system 200, clients 300 may detect: i) distributed physical memory 217 including physical memories 212 of caching servers 210, and ii) effective storage space 218 including the disks 213 of the caching servers 210. The respective disk 213 includes files 219 holding persistent data. Without loss of generality, FIG. 1 shows a plurality of caching servers 210, e.g. four caching servers 210. As such, in other embodiments, the number of caching servers 210 may be different.

As indicated above, clients 300 are adapted to access (at least some of) the data stored in storage system 200 through network 400. Each of clients 300 may, for example, include client application 310 and storage library 320. Client application 310 is linked, via link 330, to storage library 320 for accessing storage system 200. In particular, storage library 320 is adapted to communicate with caching servers 210 of storage system 200 on writing data to or reading data from storage system 200.

As depicted in FIG. 1, client applications 310 and caching servers 210 are adapted to run on a disjoint set of computing nodes in network 400. Alternatively, client applications 310 and caching servers 210 may be adapted to run on a common set of computer nodes (not shown).

Each caching server 210 is adapted to store the data in a number of virtual memory blocks, wherein each of the virtual memory blocks refers to an associated memory-mapped file 211 in a file system of caching server 210. Further, the respective caching server 210 is adapted to export addresses (virtual addresses) of the virtual memory blocks to each of clients 300. As a result, each of clients 300 is adapted to access (at least some of) the virtual memory blocks through RDMA R, W using (at least some of) the exported addresses. Using RDMA includes RDMA read operations R and RDMA write operations W.

Moreover, the respective caching server 210 is configured to page P one or more virtual memory blocks being accessed by one or more clients 300 through RDMA R, and W to and/or from memory-mapped files 211 associated with the accessed virtual memory blocks.

In this embodiment, persistent caching system 100 is identified by clients 300 as a storage system. In this embodiment, there is a reduced need to maintain consistency between physical memory 212 (cache) and persistence storage 213 (disk). Persistent caching system 100 may provide access to hot data with ultra-low latencies due to RDMA read operations from physical memory 212.

Furthermore, in some embodiments, persistent caching system 100 may hold data bigger than cluster DRAM size. Further still, in some embodiments, easy recovery of data from the memory-mapped files 211 is possible. In other words, each of the caching servers 210 may be shut down and re-started without losing data. For example, when caching server 210 is started, caching server 210 creates the virtual memory block from memory-mapped files 211 on disk 213 containing the persistent data.

Note that the data (e.g., stored as files), may have access rights, owners, etc. Thus, clients may be allowed to access only certain files (and blocks thereof). To that aim, access rights can be allocated to some of the memory-mapped files. The allocated access rights determine which clients are allowed to access which the memory-mapped files. For example, a first client may be able to access data A though a subset a of the export addresses, while not being able to access data B, whereas a second client may access data B though another subset b of the export addresses (while not necessarily able to access data A, etc.). For this reason and most generally, each client is adapted to access at least some of the virtual memory blocks through RDMA using at least some of the exported addresses. This distinction is not reiterated in the following. Without prejudice, it is hereafter assumed that clients can access the same data using the same exported addresses (made available to them all), for simplicity.

Next, in some embodiments, the respective caching server 210 may be adapted to serve RDMA read operations R from the clients 300 directly from its operating system page cache 212. For example, caching server 210 is configured to serve said RDMA read operations R from clients 300 directly from its operating system page cache 212 using an in-kernel soft-RDMA stack or using hardware-supported RDMA. In particular, the respective caching server 210 is configured to create the virtual memory blocks using said memory-mapped files 211. In some embodiments, at any given time, the respective caching server 210 may be adapted to store the data of one of the virtual memory blocks in the physical memory 212 or on the disk 213 in the associated memory-mapped file.

In some embodiments, storage library 320 of the respective client 300 is configured to provide and to transmit a write operation W for writing data into storage system 210 and a read operation R through RDMA for reading data from storage system 210.

In the case of a write operation W, after receiving data from storage library 320 of one of clients 300, caching server 210 stores the received data in the number of virtual memory blocks and sends a request to kernel 215 requesting kernel 215 to page P the number of virtual memory blocks out to the associated memory-mapped file 211. In this regard, in some embodiments, paging subsystem 220 pages P at least one page of the virtual memory block (being accessed by the write operation W) in from disk 213 and later pages it out to disk 213.

In some embodiments, in case of a read operation R, after receiving an RDMA read request R from a requesting client 300 at a network card of the caching server 210, the network card issues a DMA operation to copy the virtual memory block requested by the RDMA read request R to said network card, and to transmit the copied virtual memory block to the requesting client 300. In this case, in some embodiments, paging subsystem 220 pages P at least one page of the virtual memory block being accessed by said read operation R in from disk 213.

Figure 2:
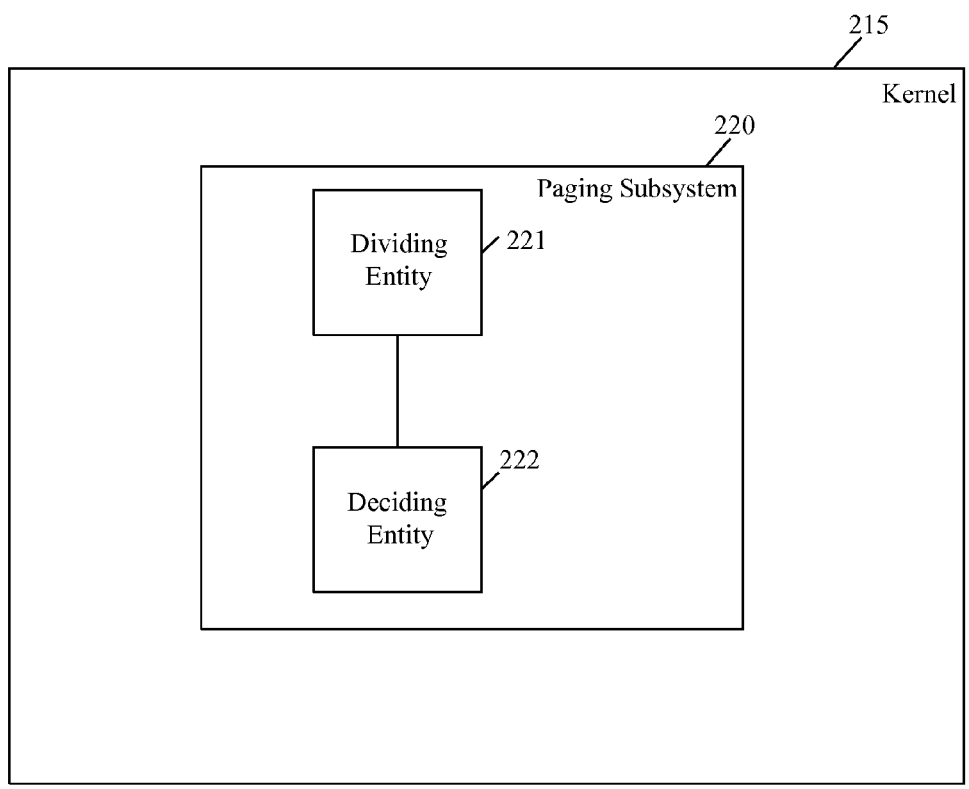
FIG. 2 shows a schematic block diagram of an extract of a kernel of a caching server of the persistent caching system of FIG. 1.

FIG. 2 shows a schematic block diagram of an extract of kernel 215 of one caching server 210 of persistent caching system 100 of FIG. 1. Kernel 215 of caching server 210 includes paging subsystem 220. In some embodiments, paging subsystem 220 is adapted to determine, at any given time, whether to store the data of the respective virtual memory block in physical memory 212 or on disk 213 in the memory-mapped file. Furthermore, in some embodiments, paging subsystem 220 is configured to keep more frequently accessed virtual memory blocks present in physical memory 212, but less frequently accessed memory blocks on disk 213 in the memory-mapped file.

As shown in FIG. 2, paging subsystem 212 includes dividing entity 221 and deciding entity 222. In some embodiments, dividing entity 221 is adapted to subdivide a virtual memory block into a plurality of pages. Further, in some embodiments, deciding entity 222 is configured to determine whether to keep a first part of the pages in physical memory 212 and a second part of the pages on disk 213. Also, in some embodiments, deciding entity 222 is configured to determine the ratio of the first and second parts.

Figure 3:
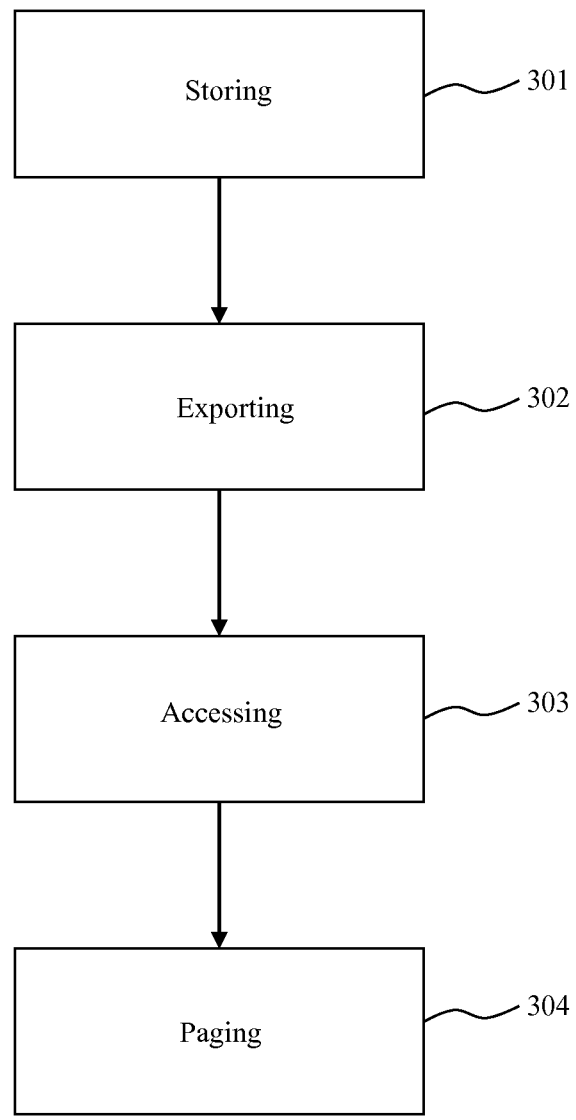
FIG. 3 shows an embodiment of a sequence of method steps for operating a persistent caching system.

FIG. 3 shows an embodiment of a sequence of method steps for operating a persistent caching system.

In FIG. 3, an embodiment of a sequence of method steps for operating a persistent caching system 100 is shown. Persistent caching system 100 may be embodied as shown in FIG. 1. In this embodiment, persistent caching system 100 includes storage system 200 that has a number of caching servers 210 for storing data, and clients 300 for accessing the data through a network 400.

The method of FIG. 3 includes the following steps 301 to 304:

In step 301, persistent caching system 100 stores the data in a number of virtual memory blocks using at least one of the caching servers 210. Therein, each of the virtual memory blocks refers to an associated memory-mapped file in a file system of the caching server 210.

In step 302, persistent caching system 100 exports addresses, in particular virtual addresses of the virtual memory blocks, from the at least one caching server 210 to each of the clients 300.

In step 303, the virtual memory blocks are accessed by at least one of the clients 300, of persistent caching system 100, through RDMA using the exported addresses.

In step 304, persistent caching system 100 pages one or more virtual memory blocks, that were accessed by one or more clients through RDMA, to and/or from the memory-mapped files associated with the accessed virtual memory blocks.

Computerized devices can be suitably designed for implementing embodiments of the present invention as described herein. In that respect, it can be appreciated that the methods described herein are largely non-interactive and automated.

In exemplary embodiments, the methods described herein can be implemented either in an interactive, partly-interactive or non-interactive system. The methods described herein can be implemented in software (e.g., firmware), hardware, or a combination thereof. In exemplary embodiments, the methods described herein are implemented in software, as an executable program, the latter executed by suitable digital processing devices. In further exemplary embodiments, at least one step or all steps of above method of FIG. 3 may be implemented in software, as an executable program, the latter executed by suitable digital processing devices. More generally, embodiments of the present invention can be implemented wherein general-purpose digital computers, such as personal computers, workstations, etc., are used.

Figure 4:
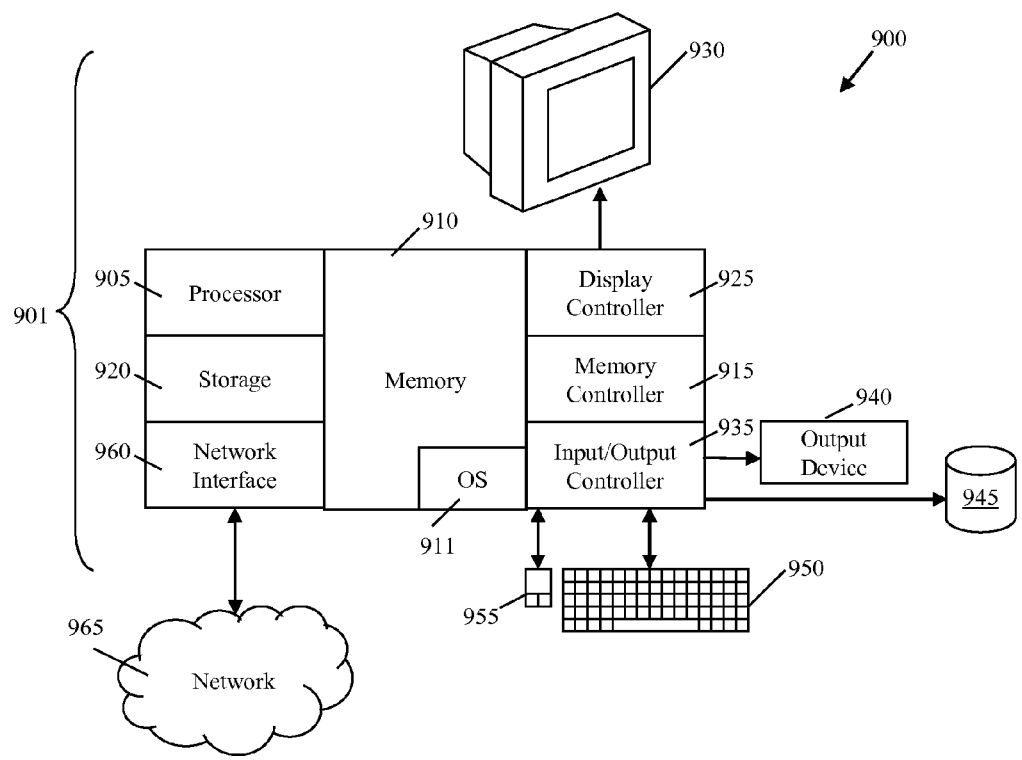
FIG. 4 shows a schematic block diagram of an embodiment of a system adapted for data transmissions using RDMA.

For instance, the system, 900, depicted in FIG. 4 schematically represents a computerized unit 901, e.g., a general-purpose computer. In exemplary embodiments, in terms of hardware architecture, as shown in FIG. 4, the unit 901 includes a processor 905, memory 910 coupled to a memory controller 915, and one or more input and/or output (I/O) devices 940, 945, 950, 955 (or peripherals) that are communicatively coupled via a local input/output controller 935. The input/output controller 935 can be, but is not limited to, one or more buses or other wired or wireless connections, as is known in the art. The input/output controller 935 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 905 is a hardware device for executing software, particularly that stored in memory 910. The processor 905 can be any custom made or commercially available processor, a central processing unit (CPU), an auxiliary processor among several processors associated with the computer 901, a semiconductor based microprocessor (in the form of a microchip or chip set), or generally any device for executing software instructions.

The memory 910 can include any one or combination of volatile memory elements (e.g., random access memory) and nonvolatile memory elements. Moreover, the memory 910 may incorporate electronic, magnetic, optical, and/or other types of storage media. Note that the memory 910 can have a distributed architecture, where various components are situated remote from one another, but can be accessed by the processor 905.

The software in memory 910 may include one or more separate programs, each of which comprises an ordered listing of executable instructions for implementing logical functions. In the example of FIG. 9, the software in the memory 910 includes methods described herein in accordance with exemplary embodiments and a suitable operating system (OS) 911. The OS 911 essentially controls the execution of other computer programs, such as the method as described herein (e.g., FIG. 3), and provides scheduling, input-output control, file and data management, memory management, and communication control and related services.

The methods described herein may be in the form of a source program, executable program (object code), script, or any other entity comprising a set of instructions to be performed. When in a source program form, then the program needs to be translated via a compiler, assembler, interpreter, or the like, as known per se, which may or may not be included within the memory 910, so as to operate properly in connection with the OS 911. Furthermore, the methods can be written as an object oriented programming language, which has classes of data and methods, or a procedure programming language, which has routines, subroutines, and/or functions.

Possibly, a conventional keyboard 950 and mouse 955 can be coupled to the input/output controller 935. Other I/O devices 940-955 may include sensors (especially in the case of network elements), i.e., hardware devices that produce a measurable response to a change in a physical condition like temperature or pressure (physical data to be monitored). Typically, the analog signal produced by the sensors is digitized by an analog-to-digital converter and sent to controllers 935 for further processing. Sensor nodes are ideally small, consume low energy, are autonomous and operate unattended.

In addition, the I/O devices 940-955 may further include devices that communicate both inputs and outputs. The system 900 can further include a display controller 925 coupled to a display 930. In exemplary embodiments, the system 900 can further include a network interface (or transceiver) 960 for coupling to a network 965.

The network 965 transmits and receives data between the unit 901 and external systems. The network 965 is possibly implemented in a wireless fashion, e.g., using wireless protocols and technologies, such as WiFi™, WiMax™, etc. The network 965 may be a fixed wireless network, a wireless local area network (LAN), a wireless wide area network (WAN) a personal area network (PAN), a virtual private network (VPN), intranet or other suitable network system and includes equipment for receiving and transmitting signals.

The network 965 can also be an IP-based network for communication between the unit 901 and any external server, client and the like via a broadband connection. In exemplary embodiments, network 965 can be a managed IP network administered by a service provider. Besides, the network 965 can be a packet-switched network such as a LAN, WAN, Internet network, etc.

If the unit 901 is a PC, workstation, intelligent device or the like, the software in the memory 910 may further include a basic input output system (BIOS). The BIOS is stored in ROM so that the BIOS can be executed when the computer 901 is activated.

When the unit 901 is in operation, the processor 905 is configured to execute software stored within the memory 910, to communicate data to and from the memory 910, and to generally control operations of the computer 901 pursuant to the software. The methods described herein and the OS 911, in whole or in part are read by the processor 905, typically buffered within the processor 905, and then executed. When the methods described herein (e.g. with reference to FIG. 3) are implemented in software, the methods can be stored on any computer readable medium, such as storage 920, for use by or in connection with any computer related system or method.

As will be appreciated by one skilled in the art, aspects of the present invention may be embodied as a system, method or a non-transitory computer program product. Accordingly, aspects of the present invention may take the form of an entirely hardware embodiment, an entirely software embodiment (including firmware, resident software, micro-code, etc.) or an embodiment combining software and hardware aspects. Furthermore, aspects of the present invention may take the form of a non-transitory computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a hard disk, a random access memory (RAM), a read-only memory (ROM), an erasable programmable read-only memory (EPROM or Flash memory), a portable compact disk read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk™, C++ or the like and conventional procedural programming languages, such as the "C" programming language or similar programming languages. The program code may execute entirely on the unit 901, partly thereon, partly on a unit 901 and another unit 901, similar or not.

Aspects of the present invention are described above with reference to flowchart illustrations and/or block diagrams of methods, apparatus (systems) and non-transitory computer program products according to embodiments of the invention. It will be understood that each block of the flowchart illustrations and/or block diagrams can be implemented by one or more computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and non-transitory computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved and algorithm optimization. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

More generally, while the present invention has been described with reference to certain embodiments, it will be understood by those skilled in the art that various changes may be made and equivalents may be substituted without departing from the scope of the present invention. In addition, many modifications may be made to adapt a particular situation to the teachings of the present invention without departing from its scope. Therefore, it is intended that the present invention not be limited to the particular embodiments disclosed, but that the present invention will include all embodiments falling within the scope of the appended claims.

The invention claimed is:

1. A persistent caching system, the system comprising:
   a client, wherein the client (a) includes a processor and a computer readable storage medium and (b) is configured to: i) access at least a portion of a data through a network, and ii) access at least a portion of virtual memory blocks through RDMA using one or more exported addresses; and
   a caching server of a storage system, wherein the caching server (a) includes a processor, a computer readable storage medium, and the data, and (b) is configured to: i) store the data in a number of virtual memory blocks, each of the virtual memory blocks referring to an associated memory-mapped file in a file system of the caching server, ii) export addresses of the virtual memory blocks to the client, and iii) page one or more virtual memory blocks being accessed by the client through RDMA to and/or from memory-mapped files associated with the accessed virtual memory blocks,
   wherein, after receiving an RDMA read request from the client at a network card of the caching server, the network card is configured to: i) issue a DMA operation to the network card, the DMA operation includes instructions to copy the virtual memory block that was indicated by the RDMA read request, and ii) to transmit the copied virtual memory block to the client that submitted the RDMA read request.

2. The persistent caching system of claim 1, wherein the caching server is configured to serve RDMA read operations from the client directly from an operating system page cache of the caching server.

3. The persistent caching system of claim 2, wherein the caching server is configured to serve RDMA read operations from the client directly from the operating system page cache using an in-kernel soft-RDMA stack.

4. The persistent caching system of claim 2, wherein the caching server is configured to serve RDMA read operations from the client directly from the operating system page cache using hardware supported RDMA.

5. The persistent caching system of claim 1, wherein the client includes a client application and a storage library, the client application being linked to the storage library and provides the client access to the storage system.

6. The persistent caching system of claim 1, wherein the caching server is configured to create the virtual memory blocks using memory-mapped files.

7. The persistent caching system of claim 1, wherein a kernel of the caching server includes a paging subsystem which is configured to determine whether to store data included in a virtual memory block in a physical memory or on a disk of the memory-mapped file.

8. The persistent caching system of claim 7, wherein the caching server is configured to store data included the virtual memory block in a physical memory.

9. The persistent caching system of claim 7, wherein the caching server is configured to store data included in the virtual memory block on a disk of the associated memory-mapped file.

10. The persistent caching system of claim 7, wherein the paging subsystem is configured to keep more frequently accessed virtual memory blocks present in the physical memory and less frequently accessed virtual memory blocks on the disk of the memory-mapped file.

11. The persistent caching system of claim 7, wherein the paging subsystem is configured to: i) subdivide a virtual memory block into a plurality of pages, and ii) decide whether to keep a first part of the plurality of pages in the physical memory and a second part of the plurality of pages on the disk of the memory-mapped file.

12. The persistent caching system of claim 5, wherein the storage library is configured to provide a write operation for writing data into the storage system and a read operation through RDMA for reading data from the storage system.

13. The persistent caching system of claim 5, wherein the caching server is configured to store data received from the storage library in a number of virtual memory blocks and to send a request for the kernel to page a number of virtual memory blocks out to the associated memory-mapped file.

14. The persistent caching system of claim 7, wherein the paging subsystem is configured to page at least one page of a virtual memory block being accessed by a write operation using the disk of the memory-mapped file.

15. A method for operating a persistent caching system, the method comprising:
   storing, by one or more processors, a data in a virtual memory block of a caching server, wherein the virtual memory block refers to an associated memory-mapped file in a file system of the caching server, wherein the caching server is configured to serve RDMA read operations from the client directly from an operating system page cache of the caching server, and wherein the caching server is configured to serve RDMA read operations from the client directly from the operating system page cache of the caching server using an in-kernel soft-RDMA stack;

exporting, by one or more processors, an address of the virtual memory block from the caching server to a client;

in response to a request from the client that includes the address, accessing, by one or more processors, the virtual memory block through RDMA using the address; and paging, by one or more processors, the virtual memory block being accessed by the client through RDMA using the memory-mapped files associated with the virtual memory block.

16. A non-transitory computer program product for operating a persistent caching system, the computer program product comprising:

one or more computer-readable storage media and program instructions stored on the one or more computer-readable storage media, the program instructions comprising:

program instructions to store a data in a virtual memory block of a caching server, wherein the virtual memory block refers to an associated memory-mapped file in a file system of the caching server;

program instructions that instruct the caching server to serve RDMA read operations directly from an operating system page cache of the caching server, wherein the RDMA read operations are from the client;

program instructions to export an address of the virtual memory block from the caching server to a client;

program instructions to respond to a request from the client that includes the address, by accessing the virtual memory block through RDMA using the address; and program instructions to page the virtual memory block being accessed by the client through RDMA using the memory-mapped files associated with the virtual memory block.

* * * * *